J. C. LAWSON.
VALVE INDICATOR.
APPLICATION FILED NOV. 19, 1913.

1,103,917.

Patented July 14, 1914.

WITNESSES:

INVENTOR,
Jasper C. Lawson,
BY
ATTORNEY

UNITED STATES PATENT OFFICE.

JASPER C. LAWSON, OF SAN FRANCISCO, CALIFORNIA.

VALVE-INDICATOR.

1,103,917.
Specification of Letters Patent.
Patented July 14, 1914.

Application filed November 19, 1913. Serial No. 802,006.

*To all whom it may concern:*

Be it known that I, JASPER C. LAWSON, a citizen of the United States, residing at San Francisco, in the county of San Francisco and State of California, have invented new and useful Improvements in Valve-Indicators, of which the following is a specification.

The object of the present invention is to provide a detachable and adjustable device for indicating the extent to which a valve controlling steam or other fluid should be opened to produce desired results.

Figure 1:
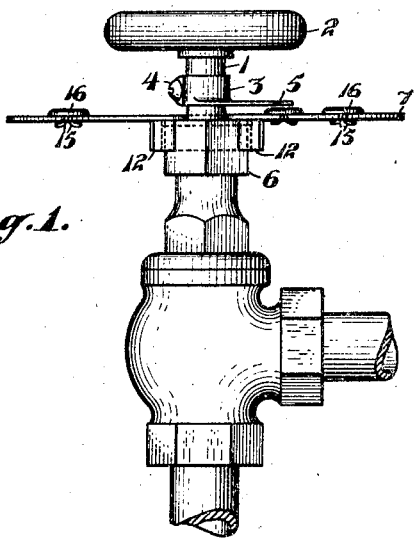
Figure 2:
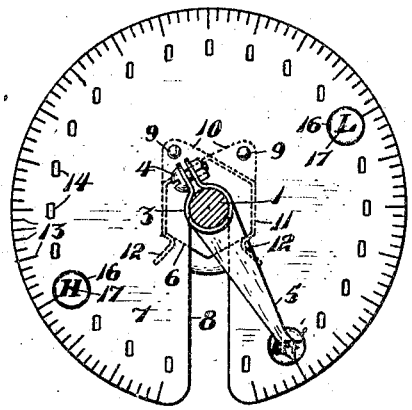
Figure 3:

In the accompanying drawing, Figure 1 is a side view of a valve equipped with my invention; Fig. 2 is a front view of the indicator detached; Fig. 3 is a perspective view of a button detached.

Referring to the drawing, 1 indicates the stem of a valve for controlling steam or other fluid, and having a head 2. On said stem I detachably secure, by a clamping device 3 and screw 4, a pointer 5. By this contrivance the pointer can be adjustably secured on the stem so that it may be caused to indicate accurately according to the magnitude of the flow of the fluid at various positions.

6 indicates the hexagonal stuffing box through which the valve stem extends.

In my invention I provide a disk 7 having a radially extending slot 8 sufficiently wide to permit the stem 1 to pass therein to the center of the disk, and at the back of said disk is riveted, as shown at 9, wings 10 extending from a spring clamp 11 having a general hexagonal form to conform with the shape of the stuffing box and having diverging ends 12 to permit it to be conveniently placed around said stuffing box. Thus, at the same time that the disk is placed around the stem, the spring is pressed into engagement with the hexagonal stuffing box, so that it is held on said stuffing box without moving, while the stem can turn at the center of the disk. Said disk is formed with a circumferential series of indicating marks 13, and also with a concentric series of elongated holes 14. Through any one of these holes can be passed fasteners 15, somewhat resembling in construction the prongs of an ordinary paper fastener, and these fasteners extend from buttons 16 having thereon indicating characters 17, such as "Off," and the letters "H" and "L," for high and low respectively. By means of these fasteners the buttons can be adjustably secured to the disk to accurately register with the positions of the pointer when the valve is opened to give the required magnitude of flow therethrough. By reason of wear on the valve, or other causes it is desirable that these indicating tags should be so made adjustable.

I claim :—

In combination with a valve stem and stuffing box therefor, a pointer adjustably secured on said stem, a disk having a radially extending slot, by which it can be passed around the stem, a spring secured to the back of the disk and partially surrounding said stuffing box and conforming in shape thereto and having diverging ends, said disk having thereon a circumferential series of indicating marks, and having also a concentric series of elongated holes, fasteners through said holes, and buttons secured by said fasteners in said holes adjustably on the disk and having indicating characters thereon.

In testimony whereof I have hereunto set my hand in the presence of two subscribing witnesses.

JASPER C. LAWSON.

Witnesses:
FRANCIS M. WRIGHT,
D. B. RICHARDS.